United States Patent [19]

Gore

[11] Patent Number: 5,427,396
[45] Date of Patent: Jun. 27, 1995

[54] TRAILER

[76] Inventor: David R. Gore, 3044 S Akron St., Denver, Colo. 80231

[21] Appl. No.: 114,970

[22] Filed: Sep. 2, 1993

Related U.S. Application Data

[63] Continuation-in-part of Ser. No. 894,255, Jun. 8, 1992, abandoned.

[51] Int. Cl.⁶ ............................................. B62K 27/00
[52] U.S. Cl. ..................................... 280/204; 280/494; 280/503; 280/756; 224/320
[58] Field of Search ................. 280/204, 78, 756, 494, 280/492, 503, 504; 224/320, 324, 42.43, 42.44, 42.45 R

[56] References Cited

U.S. PATENT DOCUMENTS

| | | | |
|---|---|---|---|
| 1,601,937 | 10/1926 | Burd | 224/42.45 R |
| 4,721,320 | 1/1988 | Creps et al. | 280/204 |
| 4,756,541 | 7/1988 | Albitre | 280/204 |
| 4,772,038 | 9/1988 | MacDonald | 280/656 X |
| 5,020,814 | 6/1991 | George et al. | 280/204 |
| 5,054,800 | 10/1991 | Christensen et al. | 280/204 |
| 5,076,600 | 12/1991 | Fake | 280/204 |
| 5,098,113 | 3/1992 | Albitre | 280/204 |
| 5,171,034 | 12/1992 | Sott | 280/204 |
| 5,259,634 | 11/1993 | Berner et al. | 280/204 |
| 5,261,683 | 11/1993 | Kurdziel | 280/204 |
| 5,267,744 | 12/1993 | Berry et al. | 280/204 |

FOREIGN PATENT DOCUMENTS

| | | | |
|---|---|---|---|
| 867284 | 10/1941 | France | 280/204 |
| 221784 | 6/1942 | Switzerland | 280/204 |

Primary Examiner—Margaret A. Focarino
Assistant Examiner—Kevin Hurley

[57] ABSTRACT

A trailer connected to a vehicle to carry an extra load. The trailer has a bracket with flexible arms and a fixative. The flexible arms are adapted to form bearings together with a bicycle rear wheel axle. Because of the flexibility of the flexible arms the bracket can be pivotally connected to the axle of the rear wheel of a two-wheel vehicle without disassembling the vehicle while connecting and disconnecting it. That simplifies and accelerates the process of connecting the trailer to and disconnecting it from the vehicle. A passenger version of the trailer has rigid child chairs with safety belts mounted on the trailer base, and a safety frame, preventing children from getting hurt. The frame is pivotally mounted to the base and can be rotated about 180 degrees until it touches the ground, opening a space for loading and unloading the trailer and having more support points to prevent the trailer from falling over. A freight version of the trailer has a load mounting means adapted to mounting different sizes of standard luggage, like suitcases as well as a special trailer container.

18 Claims, 14 Drawing Sheets

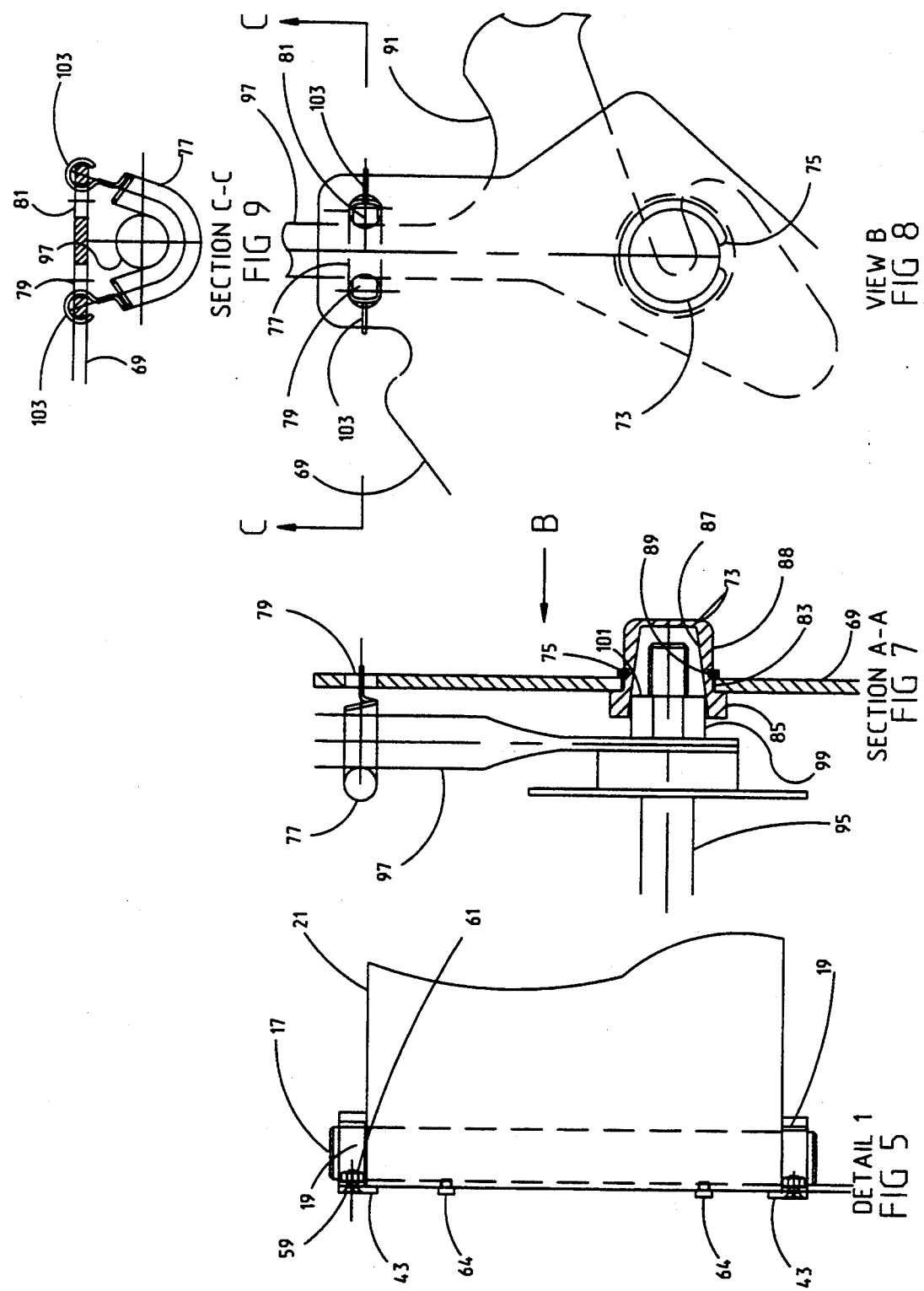

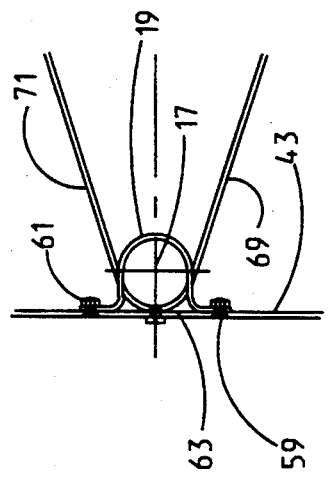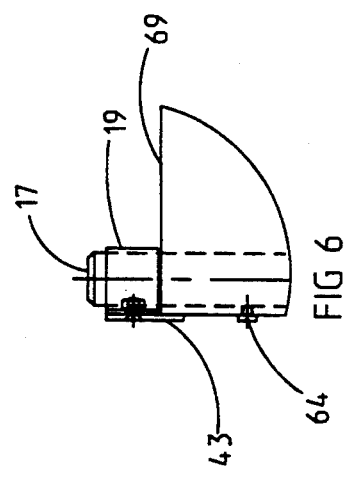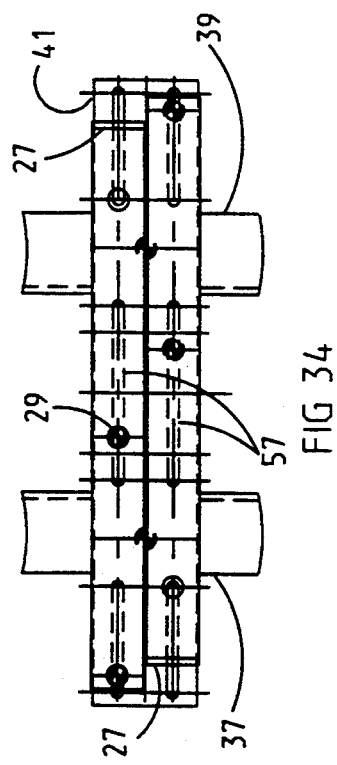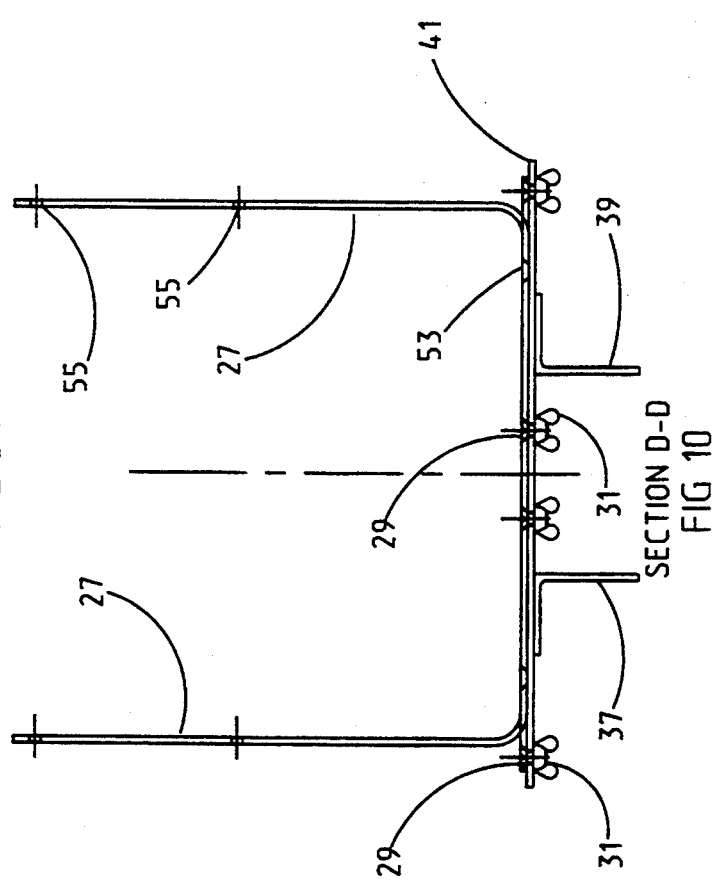

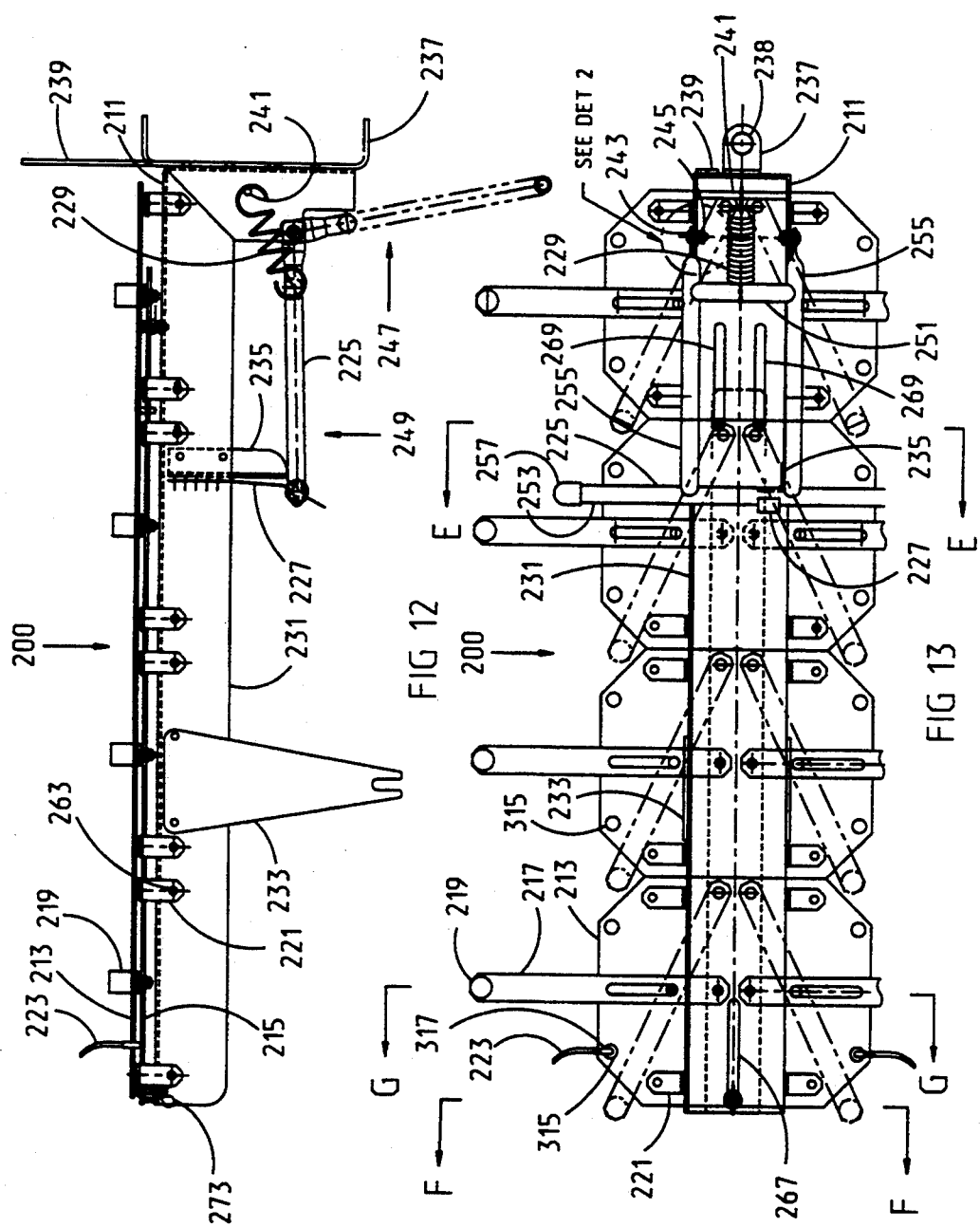

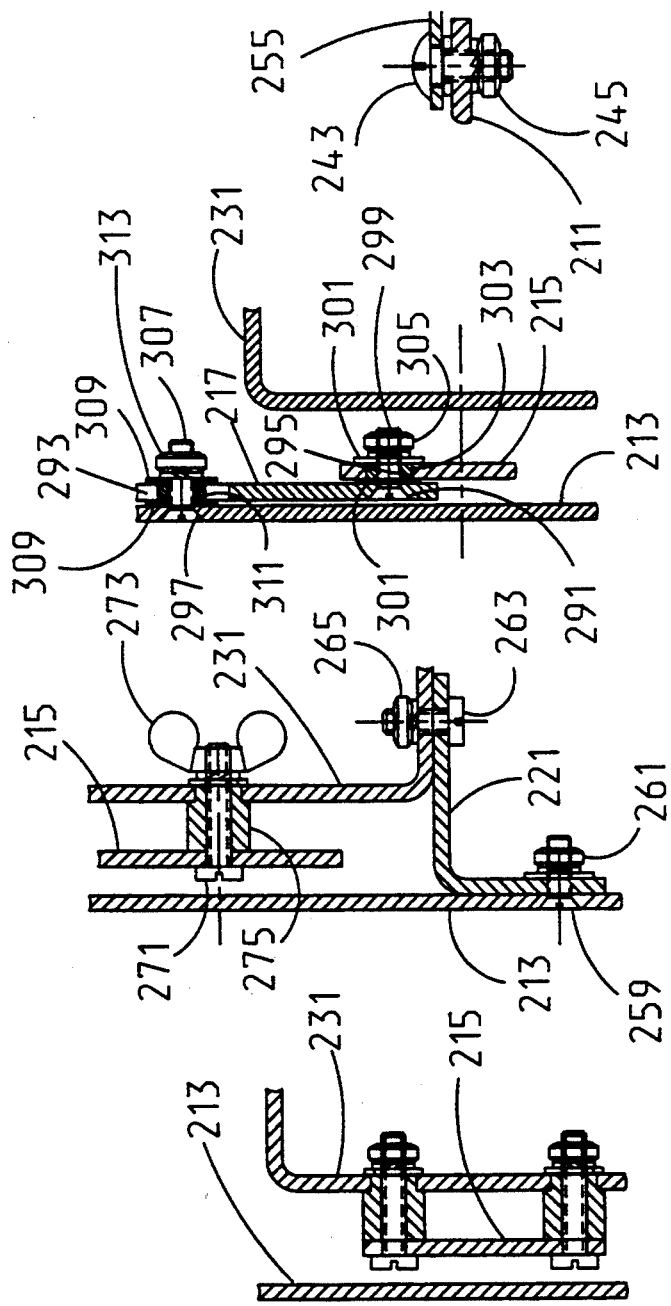

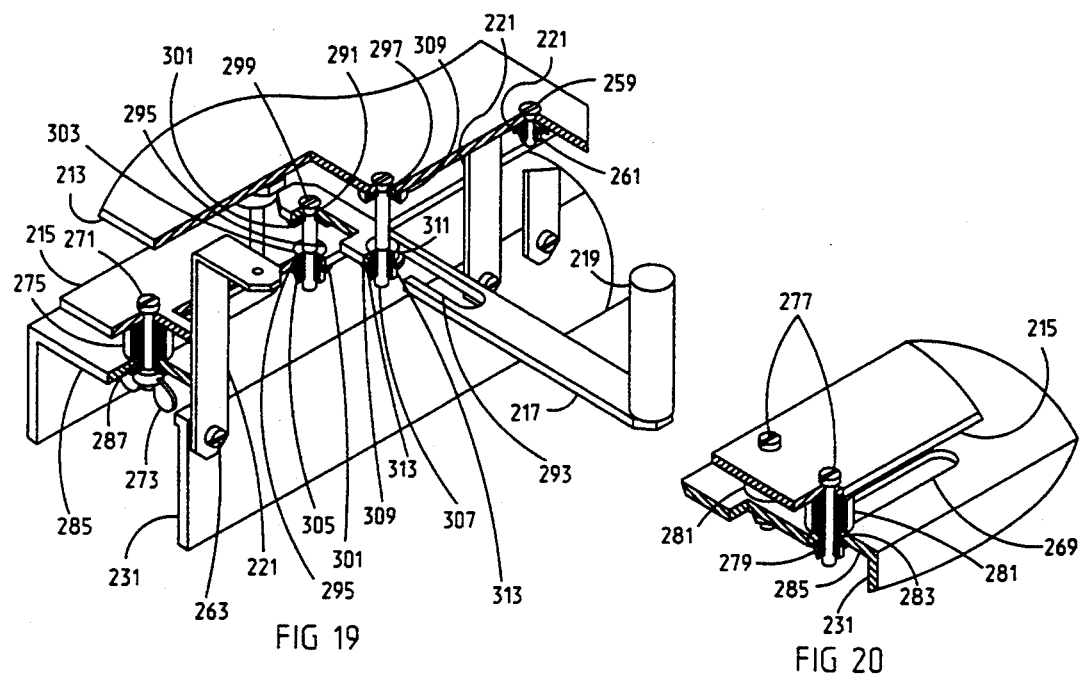

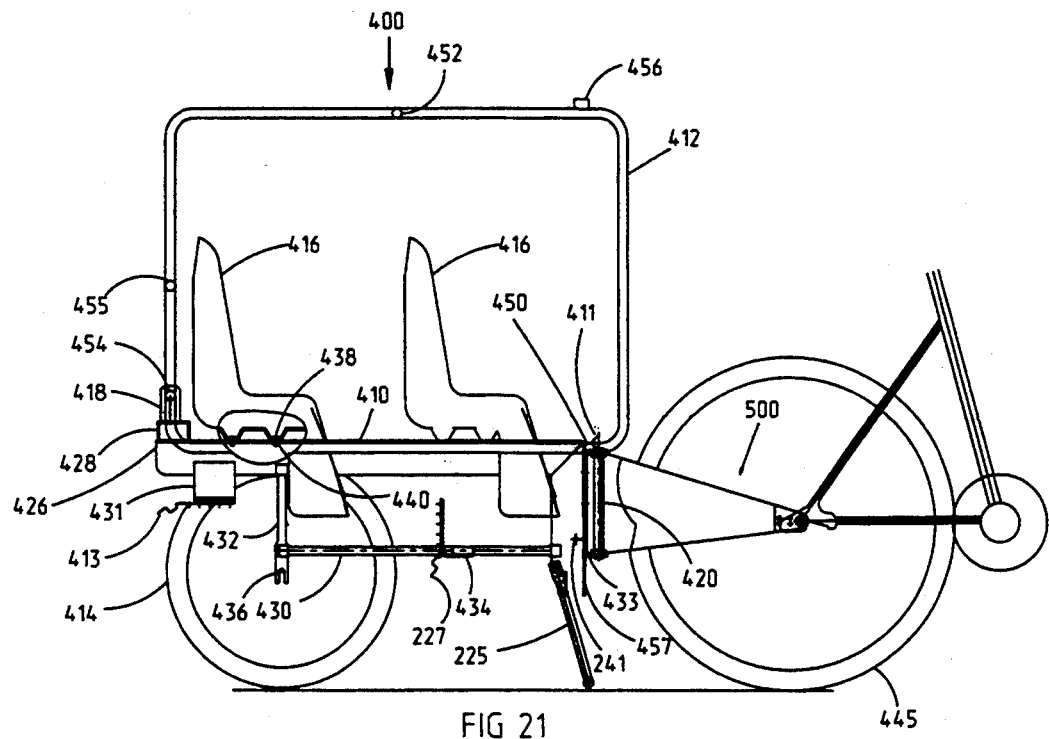

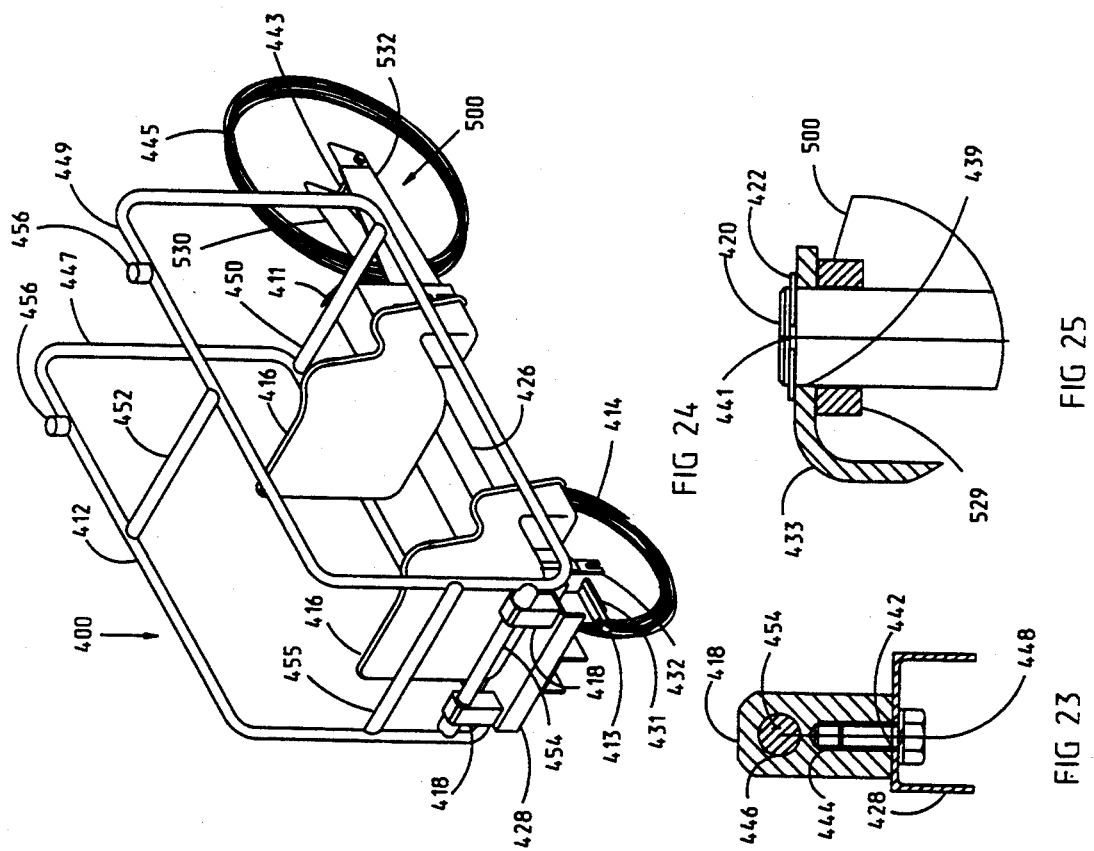

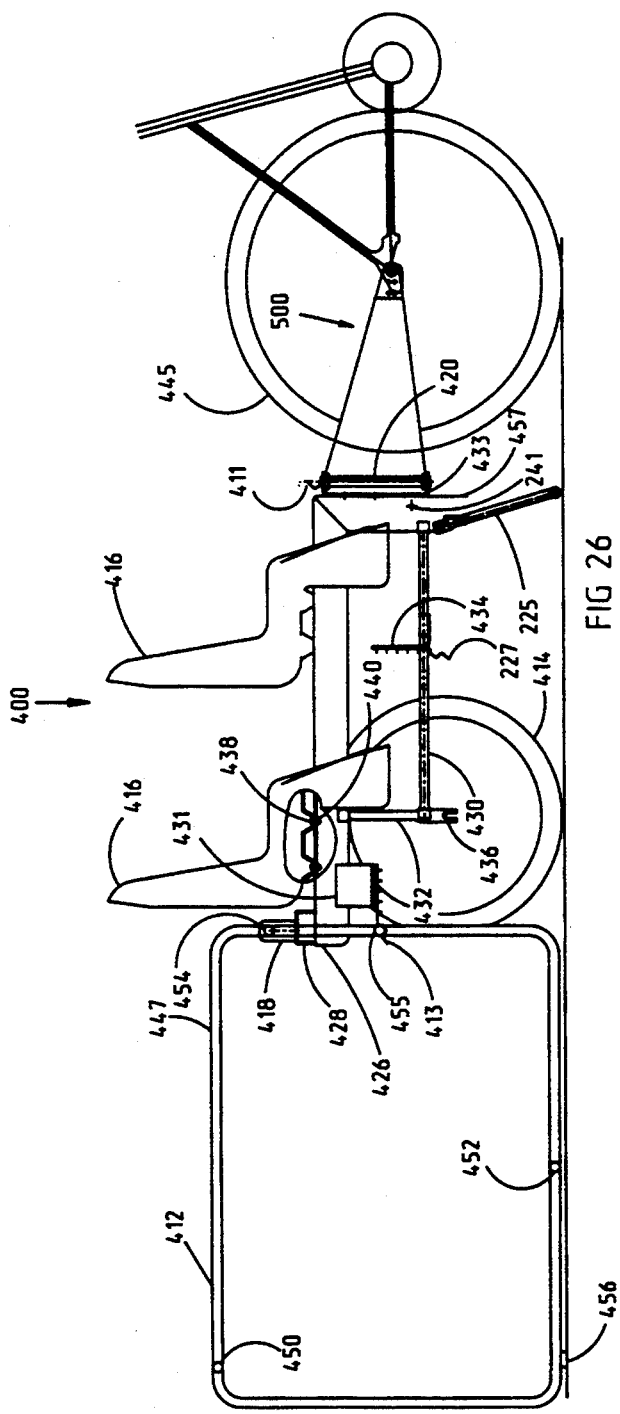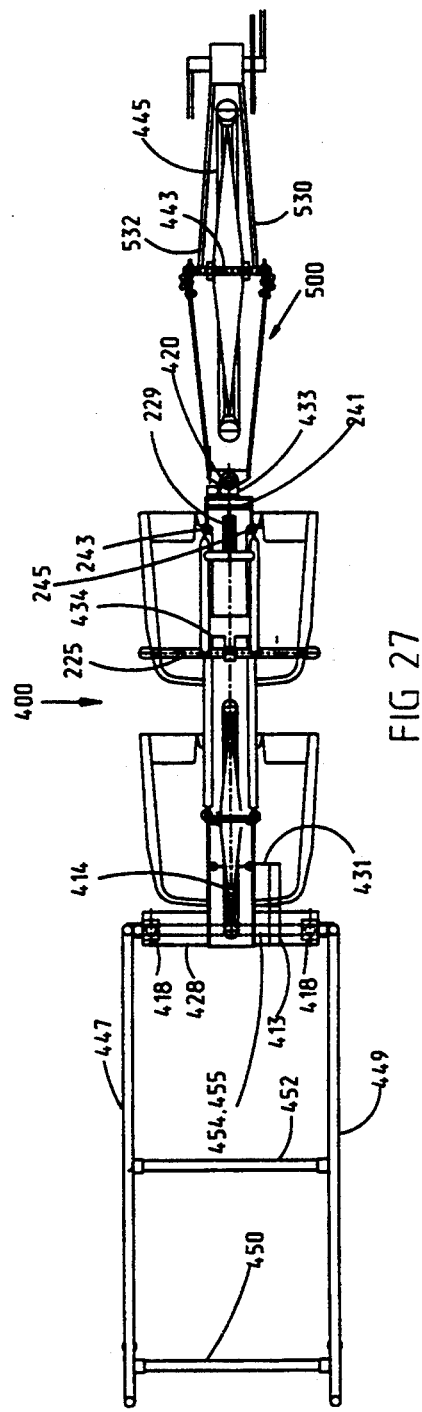
FIG 26
FIG 27

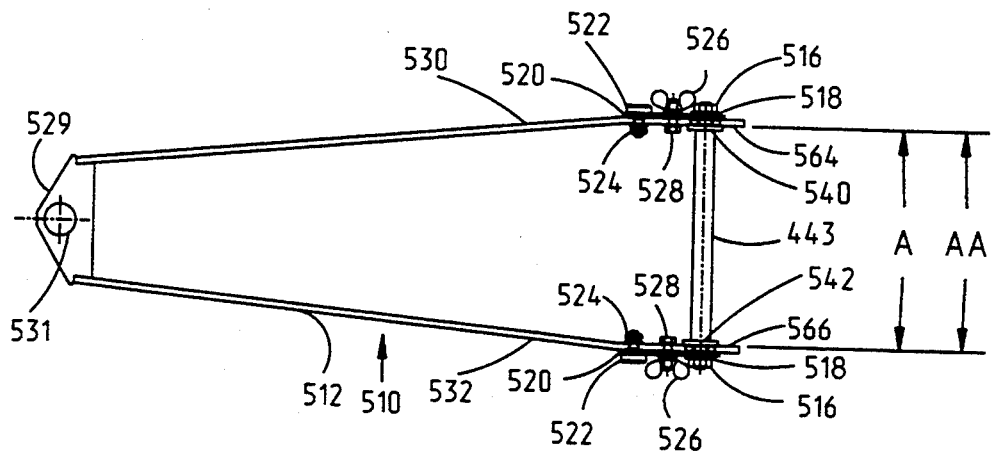
FIG 36
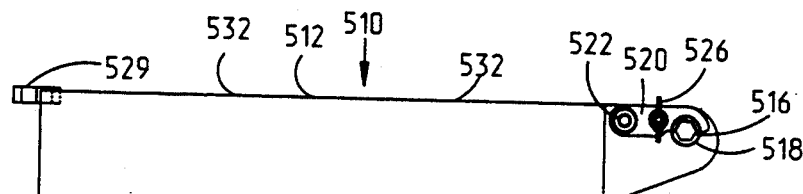
FIG 29
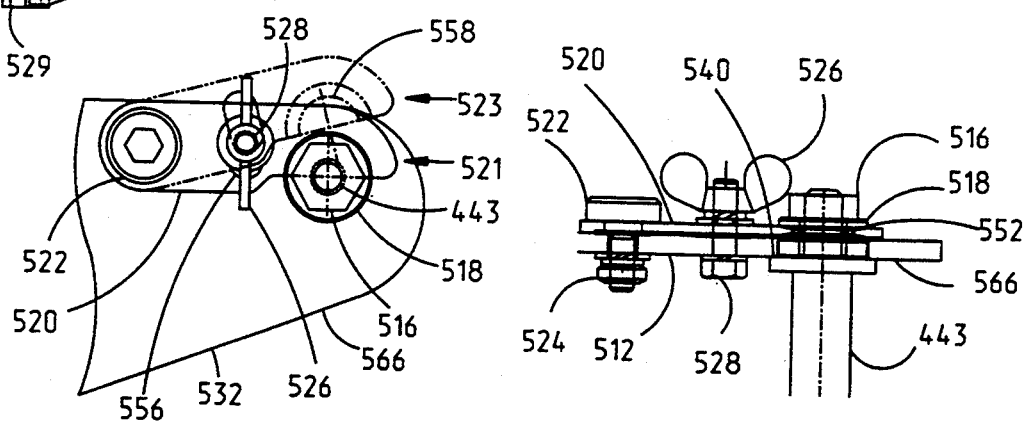
FIG 30
FIG 31

TRAILER

This application is a continuation-in-part of my application Ser. No. 07/894,255, filed Jun. 8, 1992 now abandoned.

BACKGROUND OF INVENTION

1. Field of the Invention

This invention relates to trailers, and more particularly to the bicycle trailers carrying freight or small children.

2. Brief Description of the Prior Art

Existing arts of the trailer are attached to the frame of the bicycle and have a relatively complicated and expensive attachment means mounted to a bicycle frame or they are attached to the axle of the rear bicycle wheel and require special tools for connecting the trailer and disconnecting it from the bicycle, an operation which takes a relatively large amount of time. Or they have a pivotal connection to the axle different than a bearing and have extreme wear of connecting parts.

Further, the prior arts of trailers have a special, rigidly built-in container or receptacle for luggage.

Additionally, the prior arts of the passenger trailer have relatively little safety means. Only their frames help protect the passenger from injury. The frames of prior arts of the passenger trailer open only from one side making it inconvenient for loading and unloading children.

Furthermore, the prior arts of the one-wheel passenger trailer do not have adequate support to prevent tipping while loading and unloading.

Below, one can find the description of a significantly simplified trailer where all of the previously mentioned disadvantages are eliminated.

SUMMARY OF INVENTION

The principle object of this invention is to provide people with a low-cost trailer adapted to be hooked to a bicycle or motorcycle as well as other vehicles.

Another object of the invention is to make a trailer with an adjustable load mounting means which can carry different sizes of containers or standard luggage units such as suitcases.

Still another object of the invention is to provide the trailer with a simple hooking means which can be easily and quickly hooked or unhooked without any tools.

A further object of the invention is to provide people with a trailer which requires less storage space.

Another object of the invention is to provide people with a passenger version of the trailer by a combination of safety equipment-rigid chairs, safety belt and safety frame-significantly increasing the overall safety.

A still further more object of the invention is to provide people with a passenger version of the trailer with a safety frame which can rotate up to 180 degrees for opening space for loading and unloading children and more support to prevent the trailer from tipping.

In accordance with the object of the invention, preferable embodiments of the freight trailer include: a base, a wheel, a bracket with flexible arms, a hooking means, a locking means and an adjustable load mounting means. The passenger version of the trailer includes: a base, a wheel, a bracket with flexible arms, a hooking means, a locking means, child seats, safety belts and a safety frame.

DESCRIPTION OF DRAWINGS

FIG. 5 is an enlarged elevation of a pivot.

FIG. 6 is an enlarged elevation of an end of the pivot.

FIG. 7 is an enlarged section that shows an axle of a bicycle, an insert and an elastic cord mount.

FIG. 8 is an enlarged detail of the front view showing the axle of the bicycle, the insert, and the elastic cord mount.

FIG. 9 is an enlarged section of the elastic cord mount.

FIG. 10 is a section of the guard in the minimum width position.

FIG. 12 is an elevation of the base with a quick adjusting load mounting means.

FIG. 13 is a bottom view of the base with the quick adjusting load mounting means.

FIG. 14 is an enlarged section through the front seats of the base with the quick adjusting load mounting means.

FIG. 15 is an enlarged section through the rear slot of the base with the quick adjusting load mounting means.

FIG. 16 is an enlarged section through the mounting unit of the beam carrying a lug of the load mounting means.

FIG. 17 is an enlarged section through the mounting unit of a trailer support.

FIG. 19 is an enlarged perspective view of the rear part of the base with the quick adjusting load mounting means.

FIG. 20 is an enlarged perspective view of the front part of the base with the quick adjusting load mounting means.

FIG. 21 is an elevation of a passenger version of the trailer.

FIG. 22 is a bottom view of the passenger version of the trailer.

FIG. 23 is an enlarged section through female eye.

FIG. 24 is a perspective view of the passenger version of the trailer.

FIG. 25 is an enlarged section through an end of an axle connecting a base with a bracket with flexible arms.

FIG. 26 is an elevation of the passenger version of the trailer with the frame in an open position.

FIG. 27 is a bottom view of a passenger version of the trailer with the frame in open position.

FIG. 29 is an elevation and a plan view of a flexible bracket with a hook.

FIG. 30 is an enlarged detail of the end of a flexible bracket with a hook.

FIG. 31 is an enlarged section of the end of the flexible bracket with a hook.

FIG. 33 is an enlarged top view of an end of the pivot.

FIG. 34 is a plan view of the guards in the minimum width position.

FIG. 36 is a plan view of a flexible bracket with a hook.

DESCRIPTION OF PREFERRED EMBODIMENTS

The preferred embodiment of the trailer with simplified load mount and a bracket with flexible arms having the inserts is shown in drawings 1, 2 and 32. Enlarged details of the trailer are shown in drawings 5, 6, 7, 8, 9, 10, 11, 33, 34 and 36.

Figure 3:
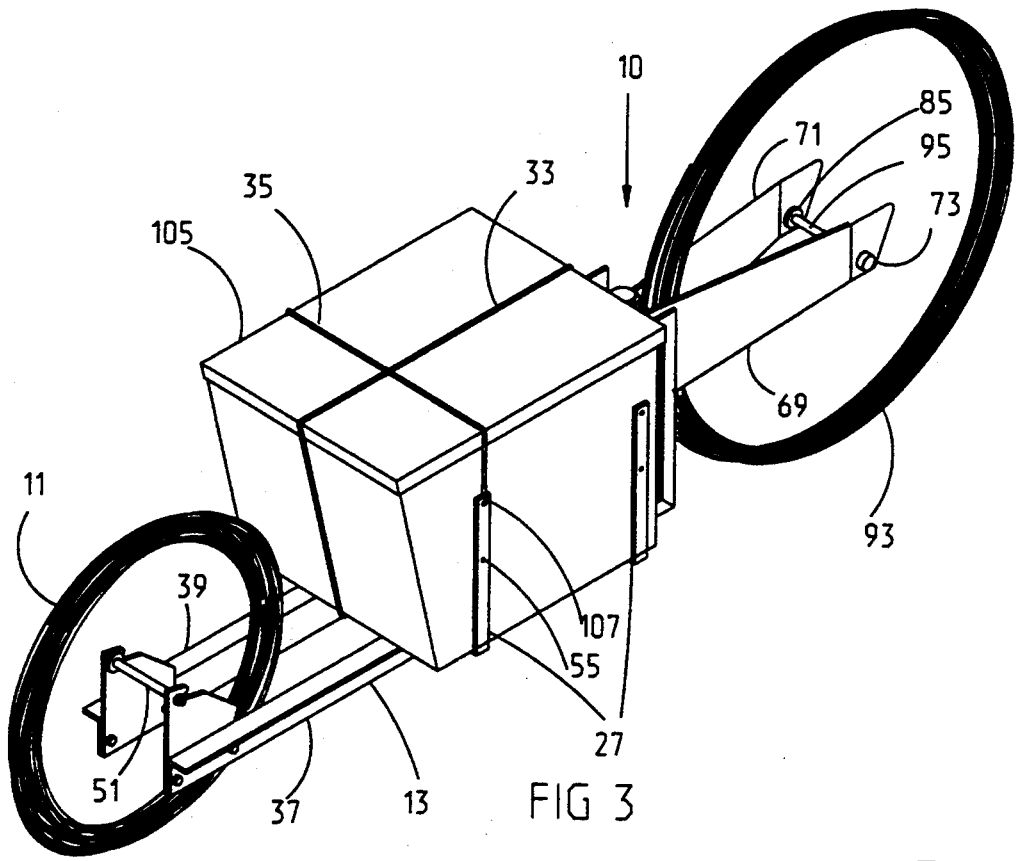
FIG. 3 is a perspective view of the simplified freight trailer with container.
Figure 4:
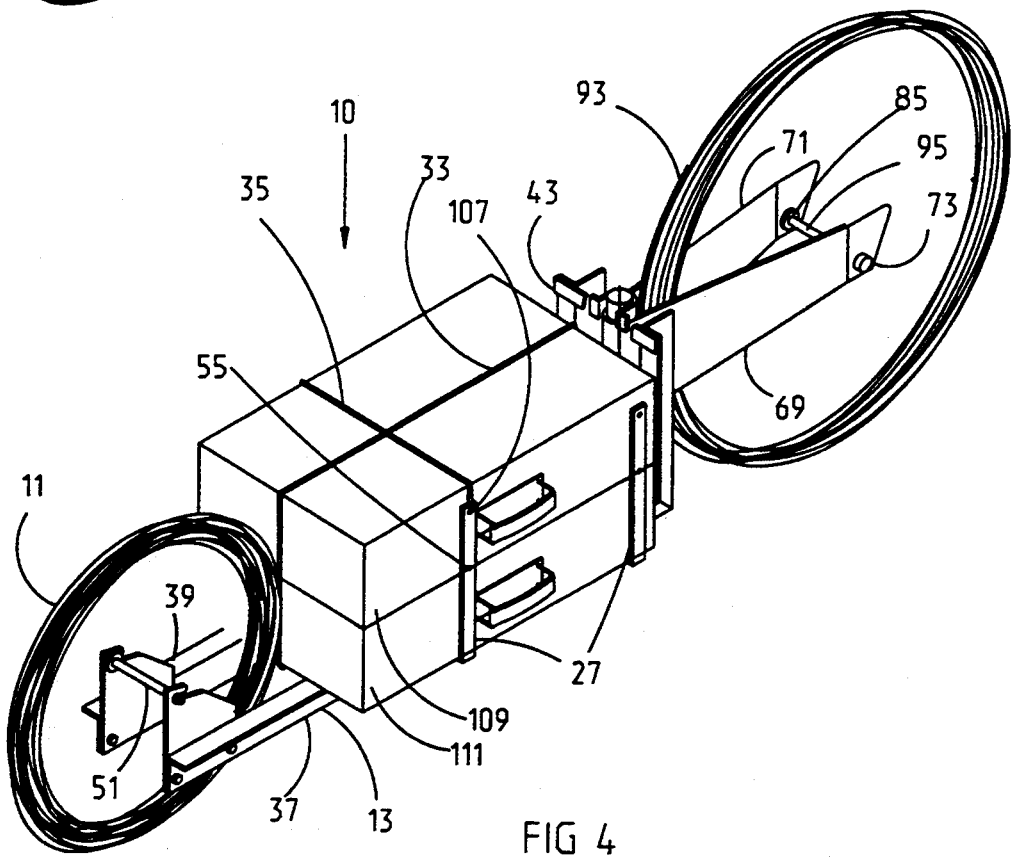
FIG. 4 is a perspective view of the simplified freight trailer with suitcases.

A trailer (10) has a wheel (11), a frame (13), trailer wheel hooks (15), an axle (17), clip bearings (19), a flexible arm bracket (21), guards (27), screws (29), wing nuts (31), and load elastic cords (33) and (35) [see also FIGS. 3 and 4].

The frame (13) has a right beam (37), a left beam (39), mounting plates (41) and cross-members (43).

The trailer wheel hooks (15) are mounted on the frame (13) by bolts (45) and nuts (47). The hooks (15) have slots (49) where the wheel (11) is mounted by its axle (51). The connection of the hooks (15) to the wheel (11) is the same as the standard connection of the frame to the rear wheel of a bicycle.

Figure 35:
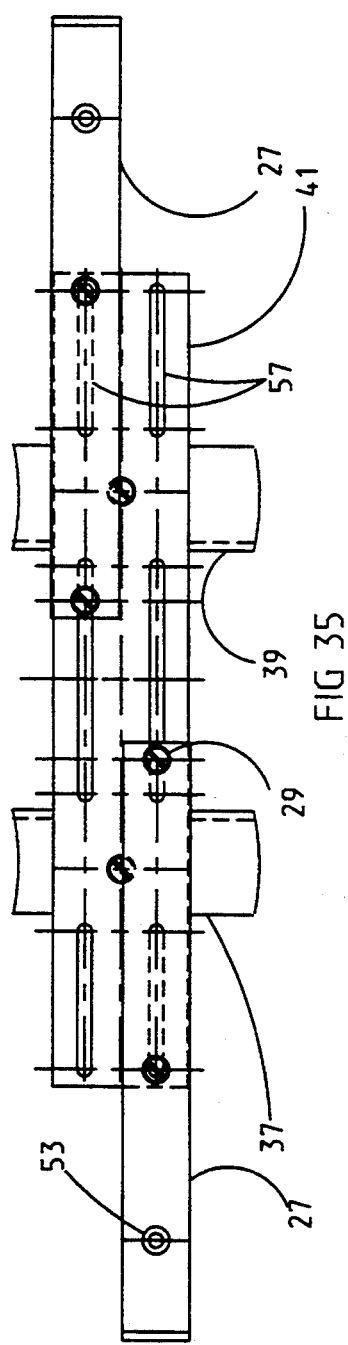
FIG. 35 is a plan view of the guards in the maximum width position.
Figure 11:
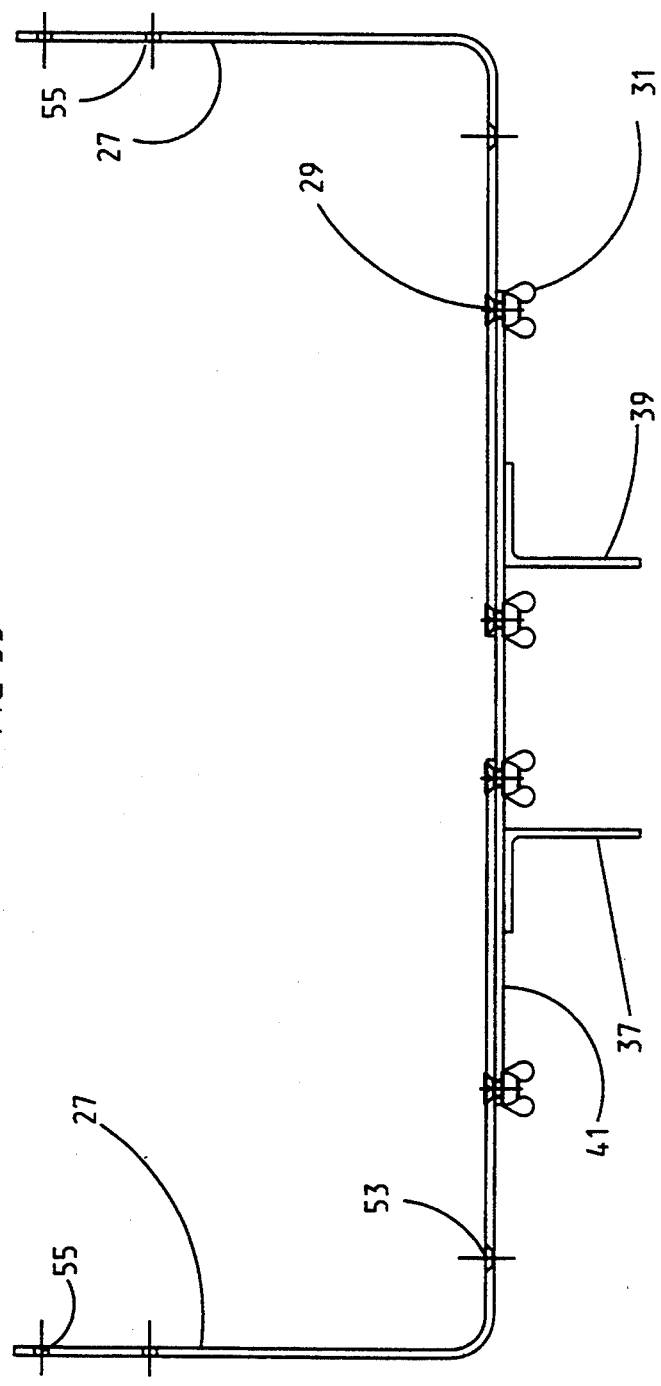
FIG. 11 is a section of the guard in the maximum width position.

The guards (27) have mounting guard holes (53) and mounting elastic cord holes (55) (see FIGS. 10, 11, 34, and 35). The mounting plates (41) have mounting plate slots (57). The screws (29) are disposed in the mounting guard holes (53) and the mounting plate slots (57). When the wing nuts (31) release the guards (27), they can be moved in different positions and then tightened in these positions by the wing nuts (31). The FIGS. 10 and 34 show the guards (27) in the narrowest position. The FIGS. 11 and 35 show the guards (27) in the widest position.

The clip bearings (19) [see FIGS. 5, 6 and 33] are mounted on the cross-members (43) by screws (59) and nuts (61). The flexible arm bracket (21) has a V-shape on its rear end (63). It mounts to the axle (17) by screws (64). The bending radii of the clip bearings (19) are slightly larger then the outside diameter of the axle (17). These bends, the cross-members (43) and the axle (17) comprise a vertical pivotal connection. The axle (17) can freely rotate inside the space formed by the inside surfaces of the cross-members (43) and the clip bearings (19). Consequently, the frame (13) can rotate relative to the flexible arm bracket (21) around the axis of the axle (17).

The flexible arm bracket (21) has flexible arms (69) and (71), inserts (73), insert retaining tings (75) and lock elastic cords (77) [see FIGS. 7, 8 and 9].

The flexible arms (69) and (71) have lock elastic cord holes (79) and (81), and attachment holes (83).

The insert (73) has a flange (85), a cone surface (87) an outside diameter (88), and a groove (89).

The inserts (73) are disposed in the attachment holes (83) of the flexible arms (69) and (71). The insert retaining tings (75) are disposed in the groove (89). They and the flanges (85) prevent the inserts (73) from loosening from the attachment holes (83) when the trailer (10) is disconnected from a bicycle.

The diameter of the attachment hole (83) is slightly larger than the outside diameter (88) of the insert (73), and the distance between the flange (85) and the groove (89) of the insert (73) is slightly larger than the thickness of the flexible arms (69) and (71). So the flexible arms (69) and (71) can freely rotate around the inserts (73).

Figure 32:
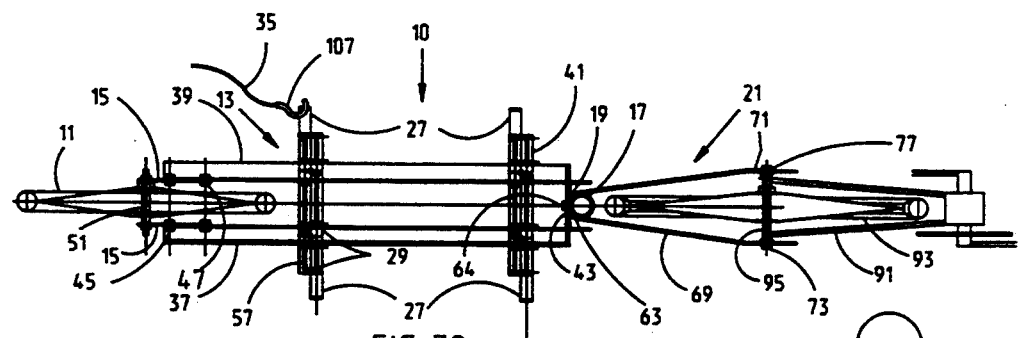
FIG. 32 is a bottom view of a simplified freight trailer.
Figure 2:
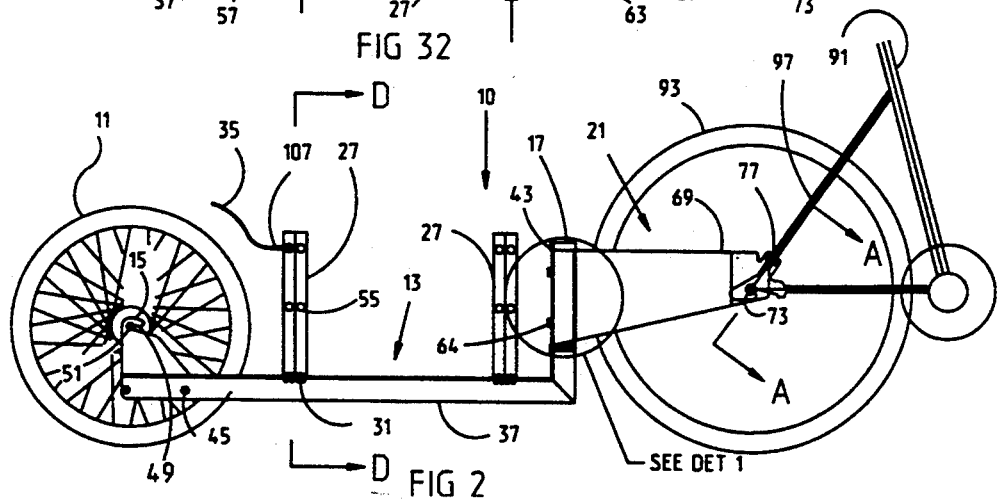
FIG. 2 is an elevation of the simplified freight trailer.

A pulling bicycle (91) has a rear bicycle wheel (93), a rear bicycle wheel axle (95) and a beam (97) [see FIGS. 2, 7 and 32]. The rear bicycle wheel axle (95) has nuts (99) on its ends [see FIG. 7]. The nut (99) has an end (101).

The inserts (73) are centered on the ends (101) of the nuts (99) when the inserts (73) are pushed towards the ends of the axle (95). Such pushing is carried out by the lock elastic cords (77) (see FIGS. 7, 8 and 9). The lock elastic cords (77) have hooks (103) which hook to the lock elastic cord holes (79) and (81) of the flexible arms (69) and (71), and envelop the beam (97) [see FIGS. 2, 7, 8 and 9] of the bicycle (91). Because the beams (97) of the bicycle (91) are rigid and are rigidly mounted on the axle (95), the flexible arms (69) and (71), and the inserts (73) are pushed by the lock elastic cords (77) to the ends (101) of the nuts (99). So the flexible arms (69) and (71) [and consequently the trailer (10)] can rotate about the axis of the axle (95) of the bicycle (91) [the FIG. 2 shows only rear part of the bicycle]. At the same time, the flexible arms (69) and (71) cannot be released from their attachment to the axle (95) until one releases one of the hooks (103) of each of the lock elastic cords (77).

Because of reasons stated above, the trailer (10) can rotate relative to the bicycle (91) around the vertical axis [the axle (17) axis] when the bicycle (91) with the trailer (10) is turned on a road, and it can rotate around the horizontal axis [the axis of the bicycle rear wheel axle (95)] when they run on a bumpy road.

Figure 1:
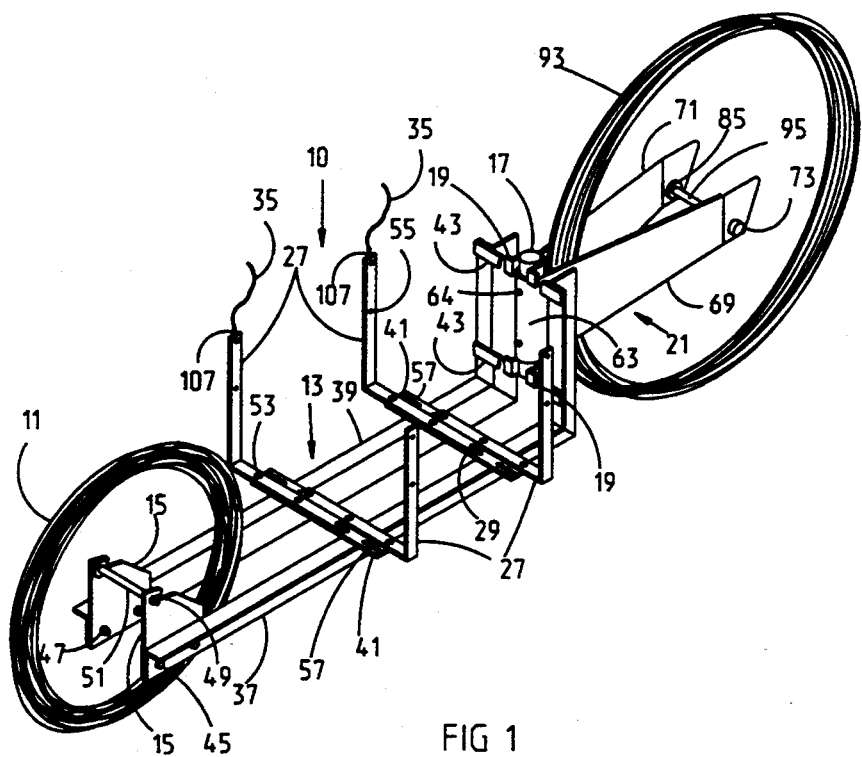
FIG. 1 is a perspective view of a simplified freight trailer utilizing the present invention.

The trailer loaded with a container is shown in FIG. 3. A container (105) is located on the frame (13) between the mounting guards (27) and is tied to the frame (13) and the mounting guards (27) with load elastic cords (33) and (35). The load elastic cords (33) and (35) have hooks (107) on both their ends. The load elastic cord (35) is hooked on both ends by its hooks (107) to one of holes (55) of the left and right mounting guards (27.) The load elastic cord (33) is hooked by its hooks (107) to the mounting plate (41) on the one side [see FIGS. 1 and 2] and a cross-member (43) on the other side.

The trailer loaded with suitcases is shown in FIG. 4. Suitcases (109) and (111) are centered, shielded and fastened to the frame (13) of the trailer (10) in the same way as the container (105).

The preferred embodiment of the base with an adjustable load mounting means which adjusts all mounting lugs by the movement of a strip is shown in drawings 12, 13 and 18. Enlarged details of the base are shown in drawings 14, 15, 16, 17, 19 and 20.

A base-assembly (200) includes a base-weldment (211), plates (213), a strip (215), guard bars (217), lugs (219), plate mounting brackets (221), load elastic cords (223), a trailer support (225), and a trailer support fixative (227) and a spring (229).

The base-weldment (211) has a body (231), wheel plates (233), a fixative bracket (235), an axle bracket (237), a load support (239) and a body cross-member (241). The wheel plates (233) carry the trailer wheel. The fixative bracket (235) carries the trailer support fixative (227). The axle bracket (237) has holes (238). The base-weldment (211) is connected to the bracket with flexible arms (500) by an axle (420) [see FIGS. 21, 22, 25, 28, 29 and description of the connection of the bracket with flexible arms (500) to the base-weldment (410) below; the connection of the flexible arms bracket (500) to the base-weldment (211) is the same as to the base-weldment (410)].

The trailer support (225) supports the trailer while stopped. It is mounted to the body (231) by shoulder screws (243) and nuts (245) (see also drawing 17), and can be rotated from a supporting position (247) to a driving position (249). The support (225) includes a short cross-member (251), a long cross-member (253), two beams (255) and two support lugs (257).

A spring (229) is mounted by one end to the body cross-member (241) and to the short cross-member (251) of the support (225) by the other end. This forces the trailer support (225) to move to the supporting position (247) or to the driving position (249).

The trailer support fixative (227) fixes the trailer support (225) in the driving position (247) and prevents it from rattling during driving.

Figure 18:
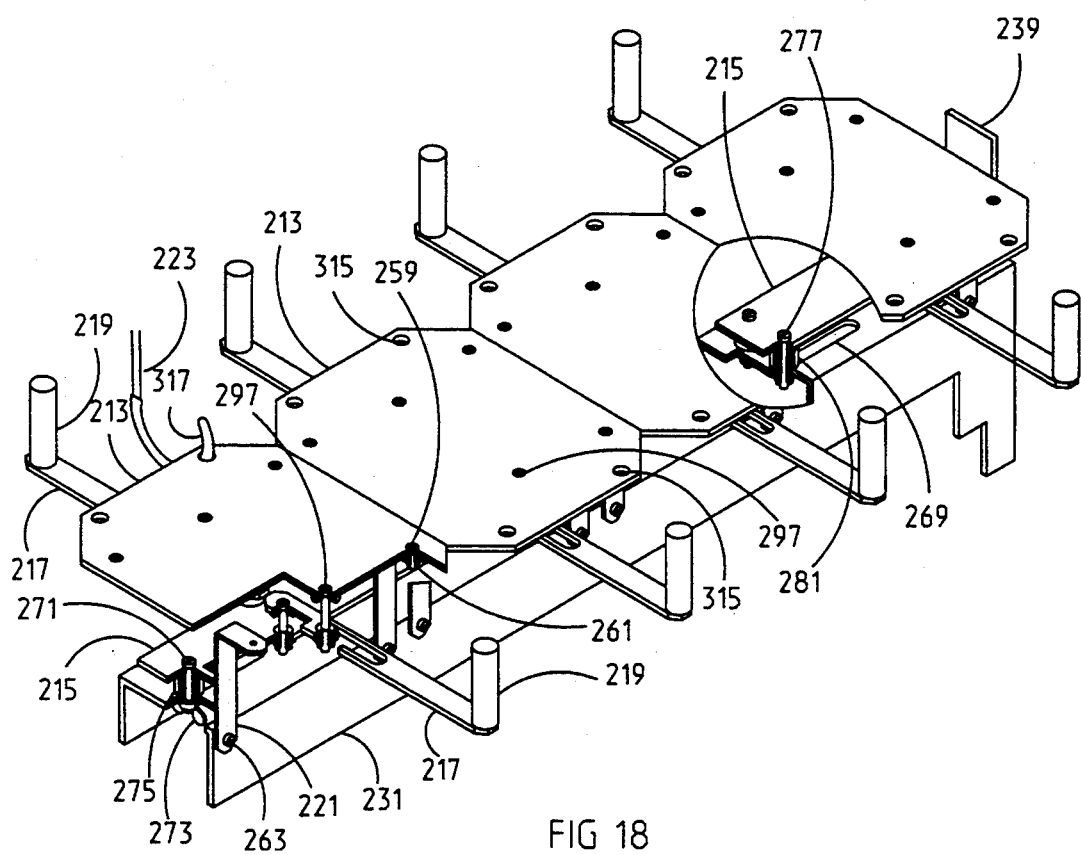
FIG. 18 is a perspective view of the base with the quick adjusting load mounting means.

The plates (213) are mounted to the body (231) by the plate mounting brackets (221), screws (259), nuts (261), screws (263) and nuts (265) [see FIGS. 15, 18 and 19].

The body (231) has a slot (267) on the rear end of it and two slots (269) on the front end. The strip (215) is mounted to the body (231) by a screw (271) and a wing nut (273) through a rear insert (275) on the rear end of the body (231), and by screws (277) and nuts (279) through front inserts (281) [see FIG. 20] on the front end. The diameter (283) of the front inserts (281) is slightly smaller than the width of the slots (269) and the length of the diameter (283) is slightly larger than the thickness of a wall (285) of the body (231). This constantly allows movement for the strip (215) and the front inserts (281) relative to the body (231). The diameter (287) of the rear insert (275) [see FIGS. 18 and 19] is slightly smaller than the width of the slot (267), but the length of the diameter (287) is smaller than the thickness of the wall (285) of the body (231). This mount allows movement for the strip (215) and the rear insert (275) relative to the body (231) only when one releases the rear insert (275) by unscrewing the wing nut (273).

The guard bar (217) has a hole (291) and a slot (293) [see drawings 16 and 19]. The strip (215) has a hole (295) and the plates (213) have holes (297). The guard bar (217) is mounted to the strip (215) by a screw (299), washers (301), a ring (303) and a nut (305), and is mounted to the plate (213) by a screw (307), washers (309), a ring (311) and a nut (313). The ring (303) is disposed in the hole (295) of the strip (215). The diameter of the hole (295) is slightly larger than the outside diameter of the ring (303). The thickness of the ring (303) is slightly larger than the thickness of the strip (215). Therefore the guard bar (217) can rotate around the axis of the hole (295) in the strip (215). The screw (307) is disposed in the hole (297) of the plate (213). The ring (311) is disposed in the slot (293) of the guard bar (217). The width of the slot (293) is slightly larger than the outside diameter of the ring (311). Therefore the guard bar (217) can slide and rotate around the ring (311). When one releases the wing nut (273) and moves the strip (215), it moves the ends of the guard bar (217). Because the center of the rings (311) do not move, the guard bars (217) are rotated around the center of the ring (303) and slide and rotate around the ring (311), moving the lugs (219) closer or further away from the center line of the base-assembly (200). After the lugs (219) reach the positions adjusted to a new size of the load, one can fasten the wing nut (273) to provide the fixing positions of all the guard bar (217) and the lugs (219).

The plates (213) have holes (315). A load (a container, suitcases etc,) is placed on the plates (213). Its position on the plates (213) is determined by the load support (239) and the positions of the lugs (219). The load is held in place by the load elastic cords (223). The load elastic cords (223) have hooks (317) on both ends. One can a put a load on the place determined by the load support (239) and the positions of the lugs (219), hook one hook (317) of the load elastic cords (223) to one of the holes (315) of the plate (213), envelop the load thereby tightening the load elastic cords (223) and hooking another hook (317) of those load elastic cords (223) to one of the holes (315) on the other side of the base-assembly (200). That procedure is about the same as is described above for drawings 3 and 4.

The preferred embodiment of the passenger version of the trailer is shown in drawings 21, 22, 23, 24, 25, 26, 27 and 17.

A trailer (400) has a base-weldment (410), an flexible arm bracket (500), a safety frame (412), a safety frame front fixative (411), a safety frame rear fixative (413), a wheel (414), two child seats (416), the trailer support (225), the trailer support fixative (227), the shoulder screws (243), the nuts (245), the spring (229), female eyes (418), an axle (420), and retaining rings (422).

The base-weldment (410) includes a body (426), the body cross-member (241), a channel (428), beams (430), posts (432), an angle (431), an axle bracket (433) and a trailer support fixative bracket (434).

The trailer support (225), the trailer support fixative (227), the spring (229), the shoulder screws (243), the nuts (245) and the body cross-member (241) are the same and have the same function as in the base with adjustable load mounting means, shown in FIGS. 12, 13 and 17.

The posts (432) have slots (436) where the wheel (414) is mounted. The connection of the posts (432) to the wheel (414) is the same as the standard connection of the frame to the rear wheel of a bicycle.

The axle bracket (433) has holes (439) where the axle (420) is disposed [see FIG. 25]. A flexible arm bracket (500) is pivotally mounted by its bearings (529) to the axle (420) [see also FIGS. 28, 29, 30, 31 and 36 the description of the flexible arm bracket with hook (500) below].

The axle (420) has grooves (441) on both of its ends. The retaining rings (422) are disposed in the grooves (441), and prevent the axle (420) and the flexible arm bracket (500) from movement in the direction of the axis of the axle (420).

The flexible arm bracket (500) is also pivotally mounted by its front end to the axle (443) of a rear wheel (445) of a pulling vehicle.

The child seats (416) are mounted to the base-weldment (410) by screws (438) and nuts (440).

The channel (428) has holes (442) [see FIG. 23]. Each female eye (418) has a female thread (444) and a hole (446). The female eyes (418) are mounted on the channel (428) by screws (448) disposed to the holes (442) of the channel (428).

The safety frame (412) includes a left frame side (447), a right frame side (449), a front cross-member (450), a medium cross-member (452) a lower rear cross-member (454) and an upper rear cross-member (455). The safety frame (412) is pivotally mounted by the lower rear cross-member (454) in the holes (446) of the female eyes (418) [see FIG. 23].

The safety frame (412) is locked in a closed position by the safety frame front fixative (411) catching an outside diameter of the front cross-member (450) [see FIGS. 21, 22, 23]. In the open position, the safety frame (412) is locked by the safety frame rear fixative (413) catching an outside diameter of the upper rear cross-member (455).

The safety frame front fixative (411) is mounted on the front surface (457) of the base-weldment (410).

The safety frame rear fixative (413) is mounted on the angle (431) of the base-weldment (410).

The safety frame front fixative (411) and the safety frame rear fixative (413) as well as the trailer support fixative (227) are flexible.

The left frame side (447) and the right frame side (449) have lugs (456) which lie down on the ground when the safety frame (412) is moved to the open position (see FIG. 26).

To move from the closed position to the open position, one has to release the front cross-member (450) from the safety frame front fixative (411) by bending the fixative (411) and rotate the safety frame (412) around the lower rear cross-member (454) about 180 degrees until the lugs (456) touch the ground and the safety frame rear fixative (413) fixes the upper rear cross-member (455) in the open position of the safety frame (412).

To move from the open position to the closed position, one has to release the upper rear cross-member (455) from the safety frame rear fixative (413) by bending the fixative (413), and rotate the safety frame (412) around the lower rear cross-member (454) in the opposite direction until it reaches the closed position and the safety frame front fixative (411) catches the front cross-member (450).

A flexible arm bracket with hook is shown in drawings 28, 29, 30, 31 and 36.

A flexible arm bracket with hook (500) has a bracket (512), stepped nuts (516), grooved rings (518), hooks (520), shoulder screws (522), nuts (524), wing nuts (526) and screws (528). The bracket (512) is hooked to a bicycle rear wheel axle (443) [see also FIGS. 2, 21, 22, and 32].

The bracket (512) has two bearings (529) and flexible arms (530) and (532). The bearings (529) have holes (531) which have a sliding fit with the trailer axle (420) [see FIGS. 21 and 25]. The flexible arms (530) and (532) have mounting holes (534), shoulder screw holes (536) and threaded holes (538).

The axle (443) belongs to the pulling vehicle. In preferable embodiment, it is the axle of the rear wheel of a bicycle. The axle has flat stops (540) and (542), and threaded ends (544) and (546).

The grooved ring (518) has an inside diameter (550), a groove (552) and an outside diameter (562).

The stepped nuts (516) have an outside diameter (548). The stepped nuts (516) are screwed on the threaded ends (544) and (546) of the axle (443). The grooved rings (518) are mounted by its inside diameter (550) on the outside diameters (548) of the stepped nuts (516).

The grooved rings (518) can freely rotate around the stepped nuts (516).

The hooks (520) have holes (554), slots (556) and openings (558). The hooks (520) are mounted on the flexible arms (530) and (532) by the shoulder screws (522) and nuts (524). The shoulder screws (522) are disposed in the holes (554) of the hooks (520) and in the shoulder screw holes (536) of the flexible arms (530) and (532). The hooks (520) can freely rotate around the shoulders (560) of the shoulder screws (522). The screws (528) are screwed to the threaded holes (538) of the flexible arms (530) and (532), and are disposed in the slots (556) of the hooks (520).

The slot (556) of the hook (520) allows the hook to rotate around the shoulder screw (522) from locked position (521) to unlocked position (523) [see FIG. 30]. In the locked position (521) the edge of the opening (558) of the hook (520) is disposed in the grove (552) of the grooved ring (518). In the unlocked position (523) the hooks (520) are released from the grooved rings (518) and allow the flexible arms (530) and (532) to move in the direction of the axis of the pulling bicycle axle (443). The wing nut (526) can fasten the hook (520) in the locked position (521) or unlocked position (523).

Figure 28:
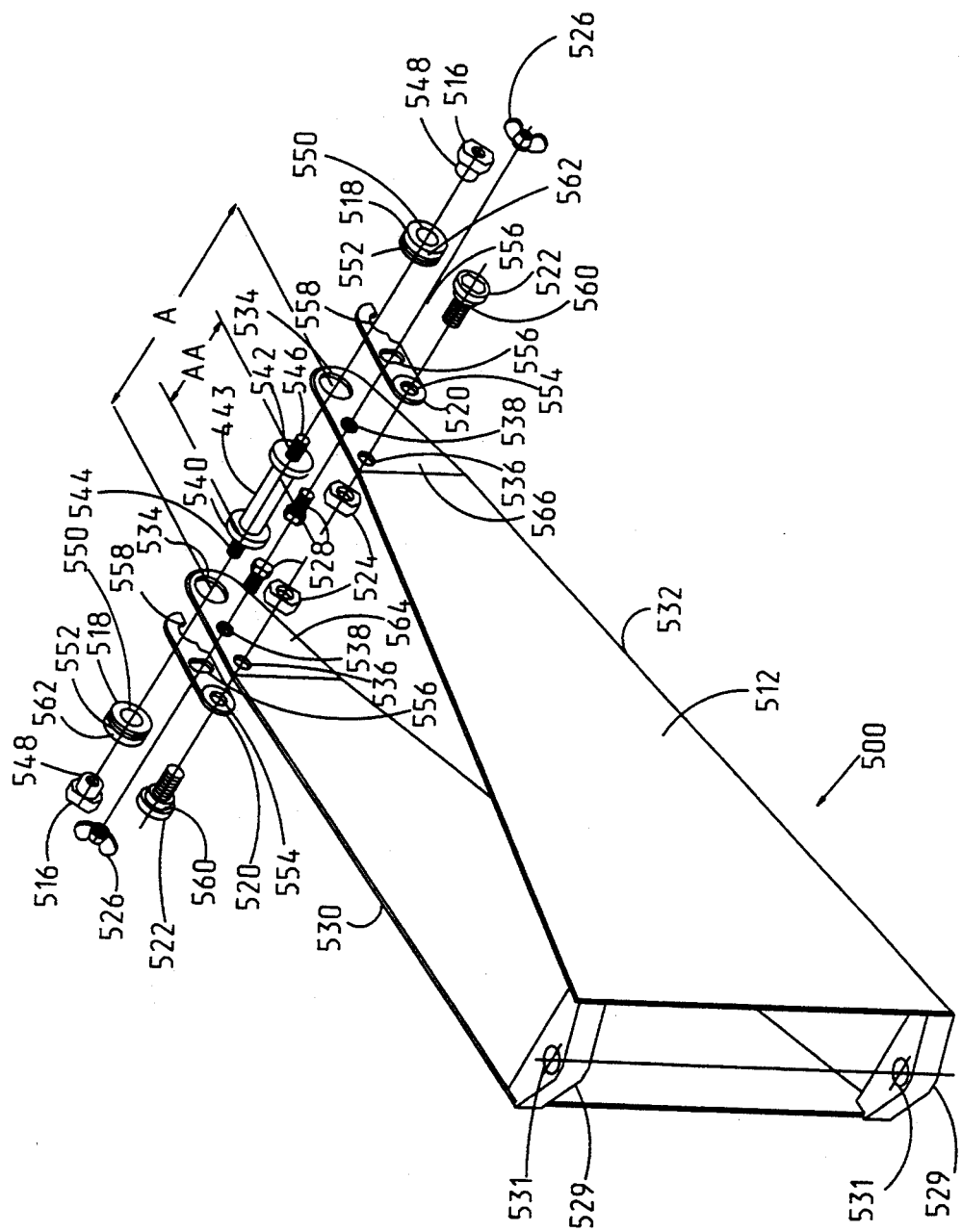
FIG. 28 is an exploded perspective view of a flexible bracket with a hook.

The distance (A) between the end (564) of the flexible arm (530) and the end (566) of the flexible arm (532) is about equal to the distance (AA) between the flat stops (540) and (542) of the axle (443) [see FIGS. 28 and 29]. Because of the flexibility of the flexible arms (530), and (532) the distance (A) can be increased by force.

To connect the flexible arm bracket with the hook (500) to a pulling bicycle, one has to move the hooks (520) to the unlocked position (523), increase, by force, the distance (A) between the end (564) of the flexible arm (530) and the end (566) of the flexible arm (532), put the holes (534) of the flexible arms (530) and (532) on the outside diameter (562) of the grooved tings (518) to remove the force, allowing the flexible arms (530) and (532) to return to their original position [to dimension (A)]. The end (564) of the arm (530) will touch the flat stops (540) of the axle (443) and the end (566) of the arm (532) will touch the flat stop (542) of the axle (443). Moving the hooks (520) around the shoulder screw (522) from the unlocked position (523) to the locked position (521), one can then dispose the edges of the openings (558) of the hooks (520) in the grooves (552) of the groove rings (518). Then one can fasten the hooks (520) in that position by tightening the wing nuts (526).

Because the flexible arms (530) and (532) are mounted on the grooved rings (518), they can freely rotate with the grooved rings (518) around the stepped nuts (516) and axle (443). That provides a pivotal connection between the flexible arm bracket (500) and the pulling vehicle. At the same time the flexible arm (530) is locked between the left hook (520) and the flat stop (440) of the axle (443) so that it cannot move in the direction of the axis of the axle (443), and the flexible arm (532) is locked between the tight hook (520) and the flat stop (442) of the axle (443) so that it cannot move in that direction.

What is claimed is:

1. A trailer having at least one wheel, a base, a bracket means, a hooking means and a fixing means; said trailer being pivotally connected to a pulling vehicle by said hooking means; said pulling vehicle having a vehicle frame and an axle; said bracket means being connected to said base and having flexible arms; said hooking means having bearings or outer part of bearings; said flexible arms and said hooking means being adapted to mount said bearings or said outer part of bearings on said axle without disassembling said pulling vehicle while being connected to or disconnected from said pulling vehicle; said fixing means adapted to positively position said hooking means on said axle; the combination of said hooking means and said fixing means being adapted to permit only pivotal movement of said trailer about said axle.

2. The trailer of claim 1 wherein, said hooking means comprising mounting holes in said flexible arms.

3. The trailer of claim 2 wherein said flexible arms are flexible in the direction of axes of said mounting holes and being rigid in other directions.

4. A trailer having at least one wheel, a base, a bracket, mounts and locks; said trailer being pivotally connected to a pulling vehicle by said mounts; said pulling vehicle having a vehicle frame and an axle; said bracket being connected to said base and having flexible arms; said mount and locks being located on said flexible arms; said flexible arms being flexible in direction of the axis of said axle and being rigid in other directions; said mounts having bearings; said flexible arms with said mounts being adapted to mount said bearings on said axle without disassembling said pulling vehicle while being connected to or disconnected from said pulling vehicle; said locks being adapted to prevent said mounts from moving in direction of an axis of said axle.

5. The trailer of claim 4 wherein said mount comprise mounting holes in said flexible arms.

6. The trailer of claim 5 wherein said flexible arms are flexible in direction of axes of said mounting holes but being rigid in other directions.

7. The trailer of claim 6 wherein said mounts further include inserts having cone surfaces; said cone surfaces being adapted to envelop both ends of said axle.

8. The trailer of claim 7 wherein said vehicle frame includes a beam; said locks comprise lock cord holes in said flexible arms and lock elastic cord; said lock elastic cord being connected to said lock cord holes and enveloping said beam of said vehicle frame.

9. The trailer of claim 5 wherein said axle has nuts and grooved rings on both of its ends; said grooved rings has an outside diameter larger than over all dimension of said nuts; said mounting holes being sliding fitted with said outside diameter of said grooved rings; said locks comprise hooks.

10. The trailer of claim 9 wherein said hooks have a hook hole, a slot and an opening; said hooks are mounted on said flexible arms by screws and nut, and being adapted to rotate around said screws from a locked to an unlocked position; said flexible arms have threaded posts and wing nuts; said threaded posts are disposed in said slot of said hooks; said hooks being adapted to be tightened by said wing nuts in said locked or unlocked positions; said opening being adapted to envelop a diameter of the groove of said grooved rings in said locked position and to open said outside diameter of said grooved rings in said unlocked position; the combination of said flexible arms, said axle, said grooved rings and said hooks being adapted to permit only pivotal movement of said flexible arms about said axle.

11. A trailer having a base, at least one wheel, a hooking means and a safety frame; said trailer being connected to a pulling vehicle by said hooking means; said base being adapted to carry child seats; said safety frame being adapted to be moved from a closed working position to an open loading position and to support said trailer from falling over in said open position.

12. The trailer of claim 11 wherein said safety frame being pivotally connected to said base; said frame having lugs positioned on top of said frame; said frame being adapted to lay down on the ground resting against the ground by said lugs.

13. The trailer of claim 12 further including a closed position fixative and an open position fixative.

14. A trailer having at least one wheel, a base, a trailer mount; a load mount; said load mount is located on said base; said trailer being connected to a pulling vehicle by said trailer mount; said load mount includes mounting plates, a strip, guard bars, guard lugs, mount brackets and load elastic cords; said mounting plates are rigidly mounted on said base by said mount brackets; said base has base slots; said mounting plates have mounting plate holes; said strip has strip holes; said guard bars have guard bars slots and holes; said guard bars are mounted on said mounting plates on one hand and on said strip on the other hand by screws and nuts; said screws are disposed in said mounting plates holes and said strip holes on one hand and in said strip holes and in said guard bars slots on the other hand; said guard lugs are mounted on said guard bars; said guard lugs and guard bars being placed in different positions by moving said strip; said mounting plates further have load elastic cord holes; said load elastic cords having hooks on their ends and being hooked to said load elastic cord holes and tightening said load to said load mounting means.

15. A trailer having at least one wheel, a base, a bracket and hooks; said trailer being connected to a pulling vehicle; said pulling vehicle includes a vehicle frame and an axle; said bracket being connected to said base and having flexible arms; said flexible arms having mounting holes and being flexible in direction of axes of said mounting holes but being rigid in other directions; said axle having nuts and grooved rings on both its ends; said grooved rings having outside diameter larger than over all dimension of said nuts; said mounting holes are sliding fitted with said outside diameter of said grooved rings; the combination of said outside diameter of said grooved rings and said flexible arms with said mounting holes forming bearings when said flexible arms are mounted on said outside diameter of said grooved rings; said hooks having a hook hole, a slot and an opening; said hooks are mounted on said flexible arms by screws and nuts, and being adapted to rotate around said screws from a locked to an unlocked position; said flexible arms have threaded posts and wing nuts; said threaded posts are disposed in said slot of said hooks; said hooks being adapted to be tightened by said wing nuts in said locked or unlocked positions; said opening being adapted to envelop a diameter of the groove of said grooved ring in said locked position, and to open said outside diameter of said grooved ring in said unlocked position; the combination of said flexible arms, axle, grooved rings and hooks being adapted to permit only pivotal movement of said flexible arms about said axle, and connect and disconnect said flexible arms with said pulling vehicle without disassembling said pulling vehicle while connecting or disconnecting.

16. A trailer having at least one wheel, a base, a bracket and lock cords; said trailer being pivotally connected to a pulling vehicle; said pulling vehicle having a vehicle frame and an axle; said vehicle frame having a beam; said bracket being connected to said base and having flexible arms; said flexible arms having mount holes, lock cord holes and inserts; said flexible arms being flexible in direction of axes of said mount holes but being rigid in other directions; said inserts and said flexible arms with said mount holes forming bearings; said inserts having cone surfaces; said inserts are disposed in said mount holes; said cone surfaces being adapted to envelop ends of said axle; said lock elastic cord being connected to said lock cord holes and enveloping said beam of said vehicle frame; the combination of said flexible arms, inserts and lock elastic cords being adapted to permit only pivotal movement of said flexible arms around said axle and connect or disconnect said flexible arms with said pulling vehicle without disassembling said pulling vehicle while being connected or disconnected.

17. A trailer having a base, at least one wheel, a hooking means and a safety frame; said trailer being connected to a pulling vehicle by said hooking means; said base having bearings and being adapted to carry child seats; said safety frame having a cross-member-axle and lugs; said cross-member-axle being disposed in said bearings; said safety frame being rotated around said cross-member-axle from an open position to a closed position; said safety frame guarding the space around all sides of said child seats, while in said closed position, and opening said space, while in said open position; said lugs being mounted on top of said safety frame; said safety frame lying down on the ground in said open position and being supported on the ground by said lugs.

18. The trailer claim 17 wherein said base has a closed position fixative and an open position fixative; said closed position fixative locks said safety frame in said closed position; said open position fixative locks said safety frame in said open position.

* * * * *